United States Patent
Qian et al.

(10) Patent No.: US 9,910,852 B2
(45) Date of Patent: Mar. 6, 2018

(54) DETECTING CASCADING SUB-LOGOGRAMS

(71) Applicant: LENOVO (Singapore) PTE, LTD., New Tech Park (SG)

(72) Inventors: Ming Qian, Cary, NC (US); Jian Li, Chapel Hill, NC (US); Song Wang, Cary, NC (US); Jianbang Zhang, Cary, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 14/656,442

(22) Filed: Mar. 12, 2015

(65) Prior Publication Data
US 2016/0267882 A1    Sep. 15, 2016

(51) Int. Cl.
| G06K 9/00 | (2006.01) |
| G06F 17/28 | (2006.01) |
| G06K 15/00 | (2006.01) |
| G06F 3/01 | (2006.01) |
| G06F 3/023 | (2006.01) |

(52) U.S. Cl.
CPC ............ *G06F 17/289* (2013.01); *G06F 3/018* (2013.01); *G06F 3/0237* (2013.01); *G06F 17/2863* (2013.01); *G06K 9/00416* (2013.01); *G06K 15/00* (2013.01); *G06K 2209/011* (2013.01)

(58) Field of Classification Search
None
See application file for complete search history.

(56) References Cited

U.S. PATENT DOCUMENTS

| 7,424,156 B2* | 9/2008 | Huang | G06K 9/6293 382/179 |
| 8,612,213 B1* | 12/2013 | Zhai | G06F 17/24 704/251 |
| 8,996,356 B1* | 3/2015 | Yang | G06F 3/0237 704/1 |
| 2008/0211777 A1* | 9/2008 | Li | G06F 3/018 345/171 |
| 2008/0215307 A1* | 9/2008 | Li | G06F 17/276 704/3 |
| 2008/0215308 A1* | 9/2008 | Li | G06F 3/04883 704/3 |
| 2009/0006292 A1* | 1/2009 | Block | G06F 3/04883 706/20 |
| 2012/0317521 A1* | 12/2012 | Ludwig | G06F 3/04883 715/863 |
| 2014/0108925 A1* | 4/2014 | Zhai | G06F 17/24 715/271 |
| 2014/0361983 A1* | 12/2014 | Dolfing | G06F 3/04883 345/156 |
| 2015/0169212 A1* | 6/2015 | Chang | G06F 3/04883 715/780 |
| 2015/0356365 A1* | 12/2015 | Collet | G06K 9/18 382/177 |

(Continued)

*Primary Examiner* — Iman K Kholdebarin
(74) *Attorney, Agent, or Firm* — Kunzler, PC

(57) ABSTRACT

For detecting cascading sub-logograms, code may detect a sub-logogram from a written input to a written input device. In addition, the code may display one or more logogram hints in response to detecting the sub-logogram. Each logogram hint includes the sub-logogram and one or more subsequent sub-logograms of a logogram sequence of multiple sub-logograms.

17 Claims, 8 Drawing Sheets

(56) References Cited

U.S. PATENT DOCUMENTS

2016/0019201 A1* 1/2016 Qian .................. G06F 3/018
                                                        704/9
2016/0104038 A1* 4/2016 Wang ............... G06K 9/00436
                                                      382/189
2016/0140094 A1* 5/2016 Wang .................. G06F 17/24
                                                      715/263

* cited by examiner

DETECTING CASCADING SUB-LOGOGRAMS

FIELD

The subject matter disclosed herein relates to written input and more particularly relates to detecting cascading sub-logograms from the written input.

BACKGROUND

Description of the Related Art

Entering logograms, such as Chinese characters, certain Japanese characters (e.g., Kanji), certain Korean characters (e.g., Hanja), and the like, may be difficult because of the complexity of certain logograms and because of the large number of logograms.

BRIEF SUMMARY

An apparatus for detecting cascading sub-logograms is disclosed. The apparatus includes a written input device, a processor, and a memory. The memory may store code executable by the processor. The code detects a sub-logogram from a written input to the written input device. The code also displays one or more logogram hints in response to detecting the sub-logogram. Each logogram hint includes the sub-logogram and one or more subsequent sub-logograms of a logogram sequence of multiple sub-logograms. A method and computer program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
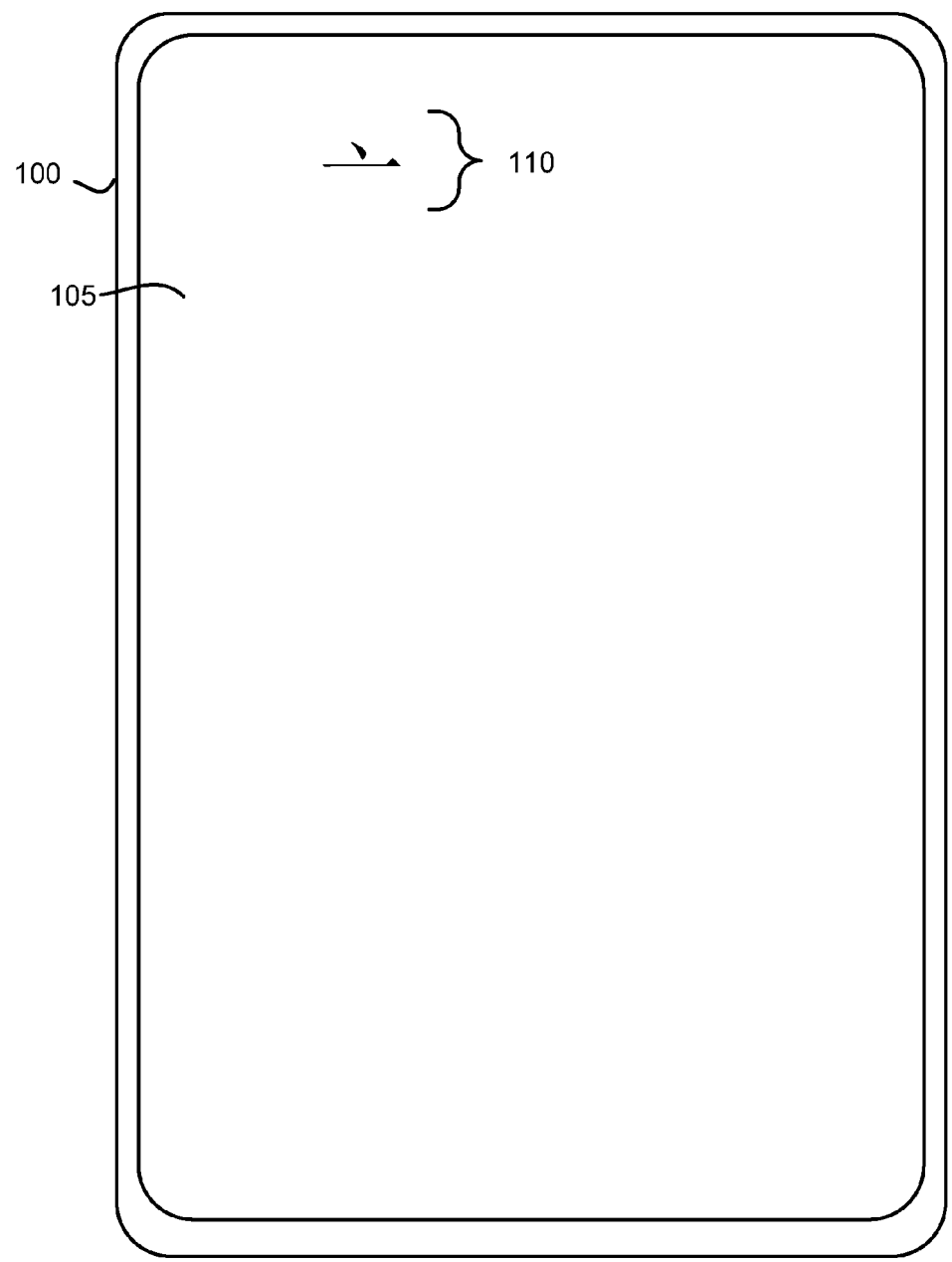
FIG. 1 is a drawing illustrating one embodiment of an electronic device.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 is a drawing illustrating one embodiment of an electronic device 100. In the depicted embodiment, the electronic device 100 is a written input device. In certain embodiments, the electronic device 100 may be a tablet computer, a mobile telephone, a laptop computer, a computer workstation, or the like. In one embodiment, the electronic device 100 includes a display 105.

The electronic device 100 is depicted as accepting written input 110. The written input 110 may be a sub-logogram, such as a portion of a logogram or a radical written by a user, or the like. In certain embodiments, the written input 110 may be a sub-logogram typed by the user. In the depicted embodiment, the written input 110 is a sub-logogram for the desired logograms that a user wishes to enter into the electronic device 100. Specifically, the written input 110 is the radical " 亠 " that is part of the desired Chinese logogram "颤." In some embodiments, the user may draw or type a sub-logogram that the user remembers to be a part of the desired logogram. The user may only input the sub-logogram rather than the desired logogram because of the complexity of certain logograms, the number of possible logograms, and/or the memory of the user. For example, the user may remember that the written input 110 " 亠 " is a sub-logogram of the desired logogram "颤." Accordingly, the user may draw or type the sub-logogram " 亠 ".

In the past, when a user entered written input 110 that included only a portion of a desired logogram, the user might not be able to find the desired logogram. The embodiments described herein detect a sub-logogram from the written input 110 to the written input device (e.g., electronic device 100). In addition, the embodiments may display one or more logogram hints in response to detecting the sub-logogram. Each logogram hint may include the sub-logogram and one or more subsequent sub-logograms of a logogram sequence of multiple sub-logograms.

Figure 2A:
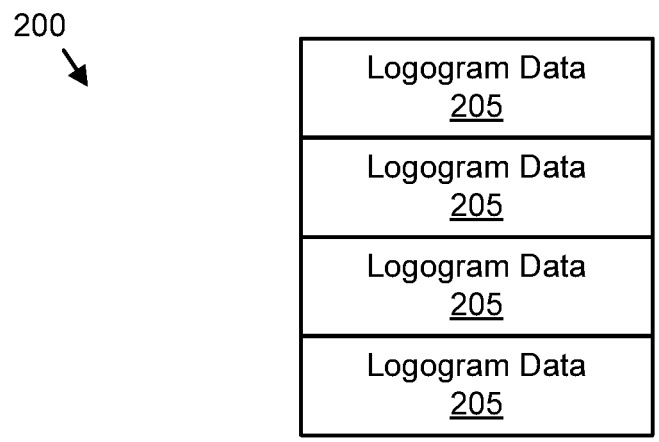
FIG. 2A is a schematic block diagram illustrating one embodiment of a logogram database.

FIG. 2A is a schematic block diagram illustrating one embodiment of a logogram database 200. The logogram database 200 may be organized as a data structure in a memory. The logogram database 200 may store logogram data 205 for multiple logograms.

Figure 2B:
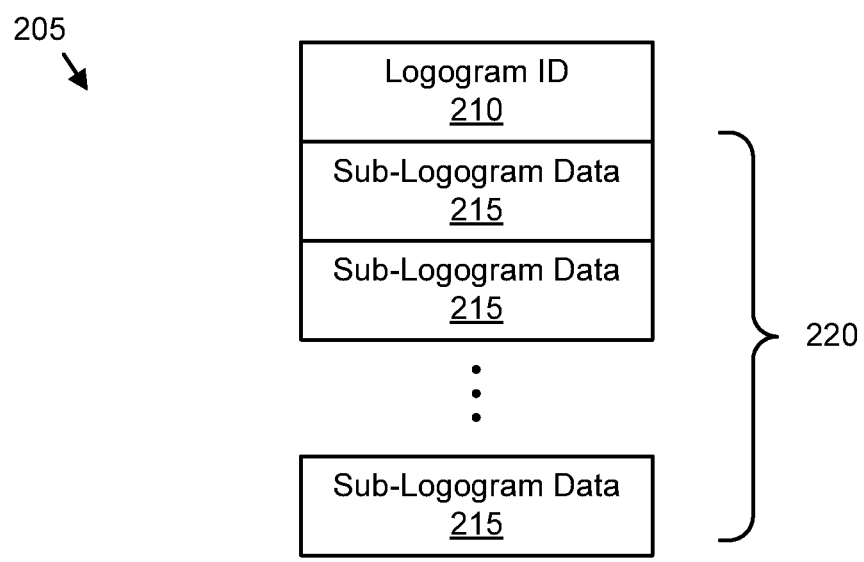
FIG. 2B is a schematic block diagram illustrating one embodiment of logogram data.

FIG. 2B is a schematic block diagram illustrating one embodiment of logogram data 205. The logogram data 205 may be organized as a data structure in the memory. The logogram data 205 may describe a given logogram. In the depicted embodiment, the logogram data 205 includes a logogram identifier 210 and sub-logogram data 215.

The logogram identifier 210 may uniquely identify a logogram. In one embodiment, the logogram identifier 210 is the Unicode value for the logogram. The sub-logograms data 215 includes data for possible sub-logograms that may be used to form the logogram. In certain embodiments, a set of sub-logograms 220 may include sub-logogram data 215 for multiple sub-logograms that may together be used to form the logogram. The set of sub-logograms 220 may include sub-logogram data 215 for any suitable number of sub-logograms, such as 2, 3, 4, 5, 6, 10, or more sub-logograms that may each be a portion of the logogram. In some embodiments, the set of sub-logograms 220 are ordered based on a proper order for writing the logogram. For example, the first sub-logogram data 215 may be the first sub-logogram that is written to render the logogram. In addition, the second sub-logogram data 215 may be the second sub-logogram that is written to render the logogram, and so forth.

Figure 2C:
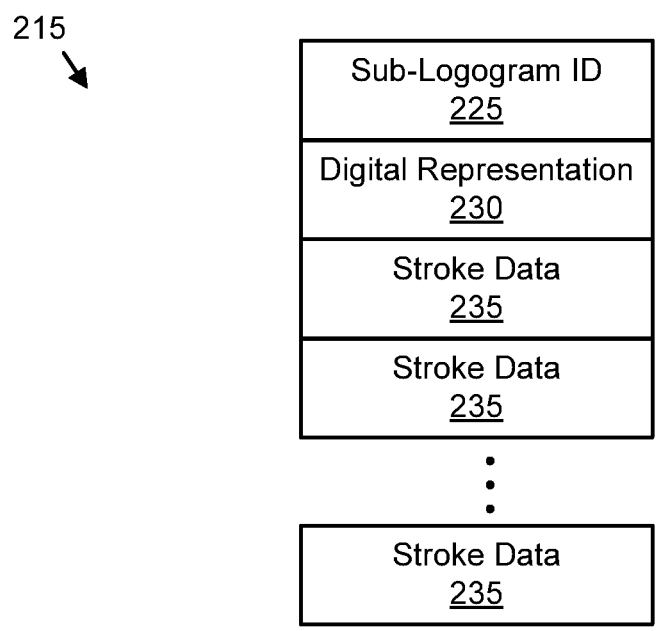
FIG. 2C is a schematic block diagram illustrating one embodiment of sub-logogram data.

FIG. 2C is a schematic block diagram illustrating one embodiment of the sub-logogram data 215. The sub-logogram data 215 may be organized as a data structure in the memory. The sub-logogram data 215 may describe a given sub-logogram. In the depicted embodiment, the sub-logogram data 215 includes a sub-logogram identifier 225, a digital representation 230, and stroke data 235.

The sub-logogram identifier 225 may uniquely identify a sub-logogram. In one embodiment, the sub-logogram identifier 225 is the Unicode value for the sub-logogram. In another embodiment, the sub-logogram identifier 225 is an assigned ID that is unique to the data structure. The digital representation 230 may be a digital value used to identify the sub-logogram. In some embodiments, the digital representation 230 is the Unicode value for the sub-logogram.

The stroke data 235 may describe one or more written strokes that render the logogram. For example, the sub-logogram data 215 may include one stroke data 235 entry for each stroke used to render the sub-logogram. Furthermore, each stroke data 235 may include a stroke number, a stroke direction, a stroke length, a stroke identifier, and the like. In certain embodiments, the stroke number may correspond with a sequence number of the respective stroke for producing a sub-logogram. For example, in an embodiment in which a sub-logogram is rendered using three strokes, there may be three stroke data 235 entries that correspond to the sub-logogram data 215 for the sub-logogram. In such an example, a first stroke data 235 entry that is to be drawn first for rendering the sub-logogram may have a stroke number of one which corresponds to its sequence number of one, a second stroke data 235 entry that is to be drawn second for rendering the sub-logogram may have a stroke number of two which corresponds to its sequence number of two, and a third stroke data 235 entry that is to be drawn third for rendering the sub-logogram may have a stroke number of three which corresponds to its sequence number of three. In some embodiments, the stroke data 235 may be ordered such that the first stroke data 235 is positioned in the sub-logogram data 215 first, the second stroke data 235 is positioned in the sub-logogram data 215 second, and the third stroke data 235 is positioned in the sub-logogram data 215 third.

Figure 3A:
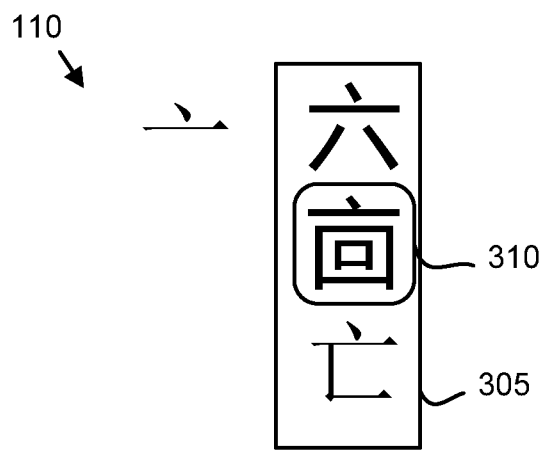
FIG. 3A is a drawing illustrating one embodiment of displaying one or more logogram hints.

FIG. 3A is a drawing illustrating one embodiment of displaying one or more logogram hints. In the depicted embodiment, a sub-logogram from the written input 110 " 亠 " to the written input device (e.g., electronic device 100) may be detected. For example, the written input device may detect the written input 110 " 亠 ." In some embodiments, the written input device may determine a Unicode representation that corresponds to the written input 110 " 亠 ." In such an embodiment, the Unicode representation for " 亠 " may be "4EA0." As may be appreciated, the Unicode representation "4EA0" may be stored in the logogram database 200. Specifically, the Unicode representation "4EA0" may be stored in the sub-logogram identifier 225 and/or the digital representation 230 portions of the sub-logogram data 215. Accordingly, the logogram database 200 may, in certain embodiments, be searched to identify sub-logogram data 215 that includes the Unicode representation "4EA0."

After the sub-logogram data 215 that includes the Unicode representation "4EA0" has been identified, the written input device may identify logogram data 205 that includes the sub-logogram data 215 having the Unicode representation "4EA0." As may be appreciated, one or more logogram data 205 may include the sub-logogram " 亠 " having the Unicode representation "4EA0." The one or more identified logogram data 205 that include the sub-logogram data 215 having the Unicode representation "4EA0" may be used to select one or more logogram hints 305 that may be displayed in response to detecting the sub-logogram " 亠 ." For example, in the illustrated embodiment, the one or more logogram hints 305 include "六," "亩," and "亡." Each of the one or more logogram hints 305 includes the sub-logogram " 亠 " and one or more subsequent sub-logograms of a logogram sequence of multiple sub-logograms. For example, the one or more logogram hints 305 include the sub-logogram "亠" and one or more of the following sub-logograms "丿丶," "回," and "凵." From the one or more logogram hints 305, the user may select a target logogram 310 "向." Moreover, in embodiments in which the target logogram 310 "向" is a sub-logogram, upon selection of the target logogram 310 "向," the written input device may display a further set of one or more logogram hints 305, as illustrated in FIG. 3B.

Figure 3B:
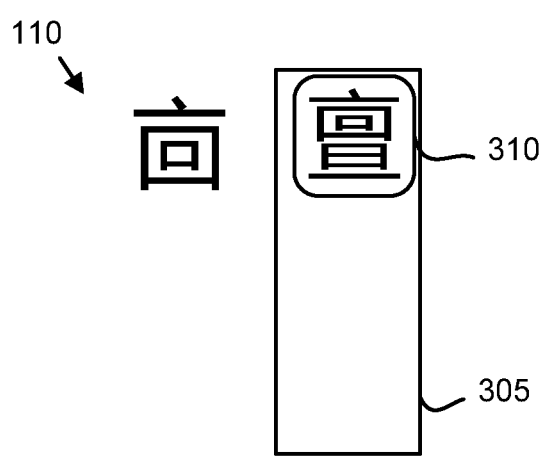
FIG. 3B is a drawing illustrating another embodiment of displaying one or more logogram hints.

FIG. 3B is a drawing illustrating another embodiment of displaying one or more logogram hints 305. In the depicted embodiment, a sub-logogram from the written input 110 "向" to the written input device (e.g., electronic device 100) may again be detected. For example, the written input device may detect the written input 110 "向." However, as may be appreciated, because the written input device received a selection to display the written input 110 "向," the written input device may merely determine what it has displayed. In some embodiments, the written input device may determine a Unicode representation that corresponds to the written input 110 "向." In such an embodiment, the Unicode representation for "向" may be "342D." As may be appreciated, the Unicode representation "342D" may be stored in the logogram database 200. Specifically, the Unicode representation "342D" may be stored in the sub-logogram identifier 225 and/or the digital representation 230 portions of the sub-logogram data 215. Accordingly, the logogram database 200 may, in certain embodiments, be searched to identify sub-logogram data 215 that includes the Unicode representation "342D."

After the sub-logogram data 215 that includes the Unicode representation "342D" has been identified, the written input device may identify logogram data 210 that includes the sub-logogram data 215 having the Unicode representation "342D." As may be appreciated, one or more logogram data 210 may include the sub-logogram "向" having the Unicode representation "342D." The one or more identified logogram data 210 that include the sub-logogram data 215 having the Unicode representation "342D" may be used to select one or more logogram hints 305 that may be displayed in response to detecting the sub-logogram "向." For example, in the illustrated embodiment, the one or more logogram hints 305 include "亶." Each of the one or more logogram hints 305 includes the sub-logogram "向" and one or more subsequent sub-logograms of a logogram sequence of multiple sub-logograms. For example, the one or more logogram hints 305 include the sub-logogram "向" and one or more of the following sub-logograms "回." From the one or more logogram hints 305, the user may select the target logogram 310 "亶." Moreover, in embodiments in which the target logogram 310 "亶 z,39" is a sub-logogram, upon selection of the target logogram 310 "亶," the written input device may display a further set of one or more logogram hints 305, as illustrated in FIG. 3C.

Figure 3C:
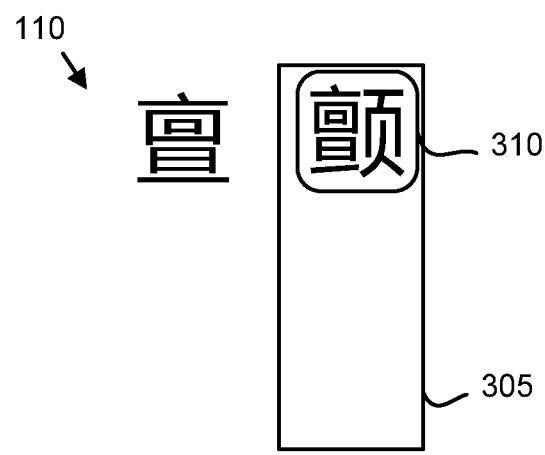
FIG. 3C is a drawing illustrating a further embodiment of displaying one or more logogram hints.

FIG. 3C is a drawing illustrating a further embodiment of displaying one or more logogram hints 305. In the depicted embodiment, a sub-logogram from the written input 110 "亶" to the written input device (e.g., electronic device 100) may again be detected. For example, the written input device may detect the written input 110 "亶." However, as may be appreciated, because the written input device received a selection to display the written input 110 "亶," the written input device may merely determine what it has displayed. In some embodiments, the written input device may determine a Unicode representation that corresponds to the written input 110 "亶." In such an embodiment, the Unicode representation for "亶" may be "4EB6." As may be appreciated, the Unicode representation "4EB6" may be stored in the logogram database 200. Specifically, the Unicode representation "4EB6" may be stored in the sub-logogram identifier 225 and/or the digital representation 230 portions of the sub-logogram data 215. Accordingly, the logogram database 200 may, in certain embodiments, be searched to identify sub-logogram data 215 that includes the Unicode representation "4EB6."

After the sub-logogram data 215 that includes the Unicode representation "4EB6" has been identified, the written input device may identify logogram data 210 that includes the sub-logogram data 215 having the Unicode representation "4EB6." As may be appreciated, one or more logogram data 210 may include the sub-logogram "亶" having the Unicode representation "4EB6." The one or more identified logogram data 210 that include the sub-logogram data 215 having the Unicode representation "4EB6" may be used to select one or more logogram hints 305 that may be displayed in response to detecting the sub-logogram "亶 z,43." For example, in the illustrated embodiment, the one or more logogram hints 305 include "颤." Each of the one or more logogram hints 305 includes the sub-logogram "亶" and one or more subsequent sub-logograms of a logogram sequence of multiple sub-logograms. For example, the one or more logogram hints 305 include the sub-logogram "亶" and one or more of the following sub-logograms "页" From the one or more logogram hints 305, the user may select the target logogram 310 "颤." In certain embodiments, the target logogram 310 "颤" may be the desired logogram; however, in other embodiments, the target logogram 310 "颤" may be another sub-logogram used to produce another set of one or more logogram hints 305. The process described in FIGS. 3A to 3C may repeat as often as needed until the desired logogram is obtained. Accordingly, by starting with a known sub-logogram that is part of a desired logogram, a user may move from the known sub-logogram to the desired logogram using a cascading process of adding additional sub-logograms until the desired logogram is obtained. Thus, a user that may not remember how to write a logogram may be aided in writing.

Figure 3D:
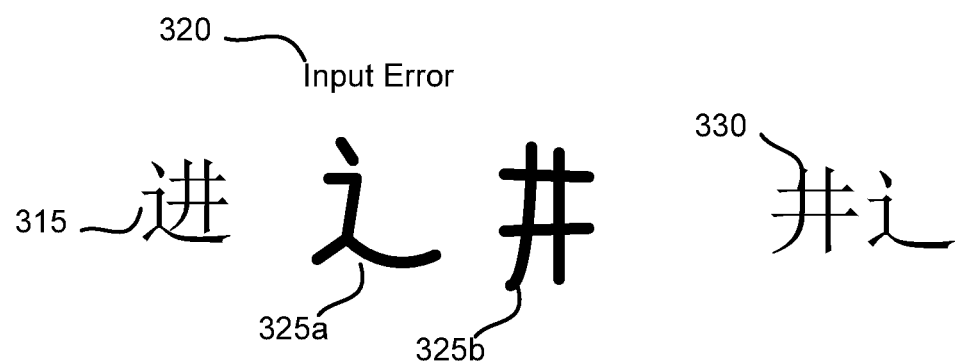
FIG. 3D is a drawing illustrating one embodiment of displaying a logogram sequence in response to detecting a sub-logogram error.

FIG. 3D is a drawing illustrating one embodiment of displaying a logogram sequence in response to detecting a sub-logogram error. In the depicted embodiment, a user may write a logogram 315 "进" to a written input device (e.g., electronic device 100). After writing the logogram 315 "进 z,49" an input error 320 may be detected and generated. For example, the input error 320 may be generated because a sub-logogram error is detected in response to a difference between the written input and a given sub-logogram of an input logogram sequence. For example, in writing the logogram 315 "进," the user may have first written a sub-logogram 325a "辶" and then written a sub-logogram 325b "井." However, the proper order is to write the sub-logogram 325b "井" followed by writing the sub-logogram 325a "辶." Thus, the input error 320 may be detected as a result. In response to detecting the input error 320, a proper logogram sequence 330 may be displayed. In the present embodiment, the proper logogram sequence 330 is to write "井" followed by "辶." Thus, in the present embodiment, the proper logogram sequence 330 is displayed by displaying each sub-logogram in the order in which they should be written. In some embodiments, displaying the proper logogram sequence 330 includes displaying Unicode for each sub-logogram in the order in which the corresponding sub-logograms are to be written. For example, the display may show "4E95 (井)->8FB6 (辶)->8FDB (进)" to display the proper logogram sequence 330.

The logogram database 200 may be used to detect the input error 320. For example, the logogram database 200 may include logogram data 205 for the logogram 315 "进." The logogram data 205 includes the set of sub-logograms 220 used to render the logogram 315 "进." As may be appreciated, the sub-logogram data 215 within the set of sub-logograms 220 may be positioned in order from the sub-logogram that is first written to render the logogram 315 "进" to the sub-logogram that is last written to render the logogram 315 "进." Accordingly, in the present embodiment, the sub-logogram data 215 for "井" may be positioned first and the sub-logogram data 215 for "辶" may be positioned second within the logogram data 205. Thus, the order that a user writes the logogram 315 "进" may be compared to the logogram data 205 to determine whether the user wrote the sub-logograms of the logogram 315 "进" in the proper sequence.

As may be appreciated, the order of strokes of each sub-logogram may also be checked for errors. This may be accomplished by comparing the order of strokes written by the user with the stroke data 235 of the sub-logogram data 215. The proper order of strokes for a sub-logogram may be shown by displaying each individual stroke of the sub-logogram to the user in an order they are to be written.

Figure 4:
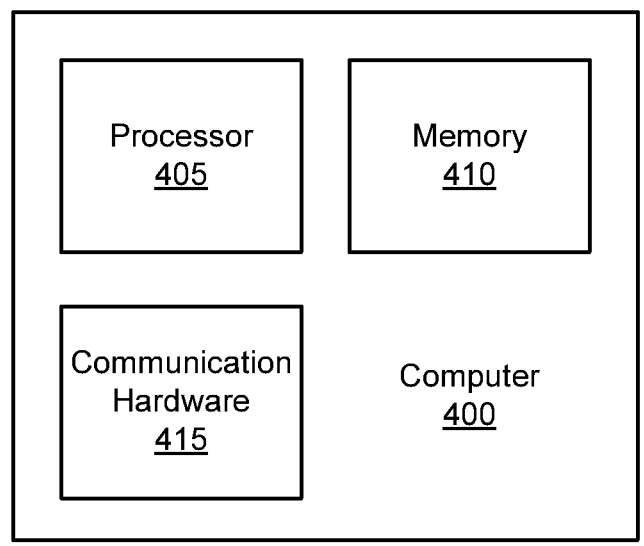
FIG. 4 is a schematic block diagram illustrating one embodiment of a computer.

FIG. 4 is a schematic block diagram illustrating one embodiment of a computer 400. The computer 400 may be embodied in the electronic device 100. Alternatively, the computer 400 may be embodied in a server in communication with the electronic device 400. In the depicted embodiment, the computer 400 includes a processor 405, a memory 410, and communication hardware 415. The memory 410 may be a semiconductor storage device, a hard disk drive, an optical storage device, a micromechanical storage device, or combinations thereof. The memory 410 may store code. The processor 405 may execute the code. The communication hardware 415 may communicate with other devices.

Figure 5:
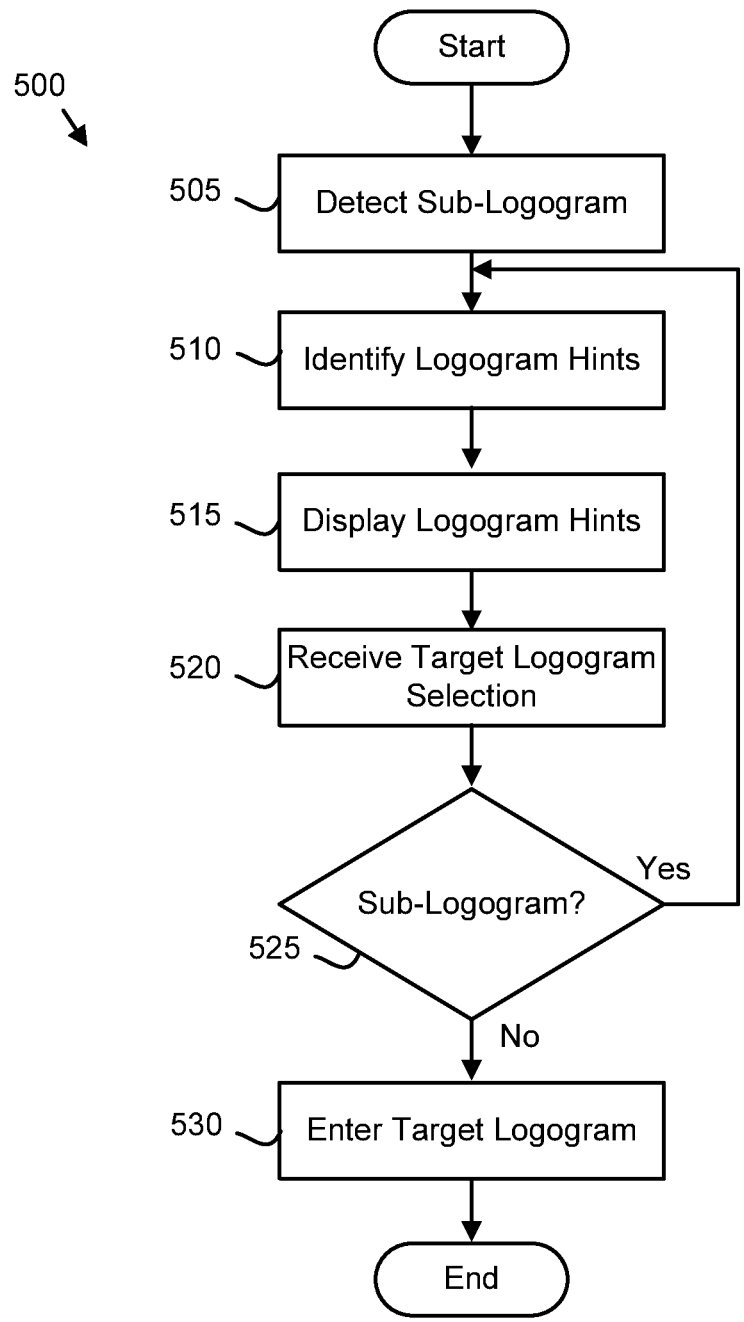
FIG. 5 is a schematic flow chart diagram illustrating one embodiment of a method that detects cascading sub-logograms.

FIG. 5 is a schematic flow chart diagram illustrating one embodiment of a method 500 that detects cascading sub-logograms. The method 500 may be performed by the processor 405. Alternatively, the method 500 may be performed by computer readable storage medium such as the memory 410. The computer readable storage medium may store code that is executable by the processor 405 to perform the functions of the method 500.

The method 500 starts, and in one embodiment, the code detects 505 a sub-logogram from a written input to a written input device. In certain embodiments, the written input device may be the electronic device 100. As may be appreciated, the code may detect 505 the sub-logogram by comparing the written input to the sub-logogram data 215 stored in the logogram database 200. Moreover, in some embodiments, the processor 405 of the computer 400 may be used to detect 505 the sub-logogram. The sub-logogram may include one or more of a Unicode representation and one or more strokes. The code may further identify 510 logogram hints. For example, the code may identify 510 one or more logogram hints by finding logogram data 205 that includes the sub-logogram data 215 corresponding to the detected sub-logogram.

The code may display 515 the one or more logogram hints 305 in response to detecting the sub-logogram. For example, the code may display 515 the logogram hints 305 on the display 105 of the electronic device 100. In some embodiments, there may be only one logogram hint 305, while in other embodiments there may be two or more logogram hints 305. Each of the one or more logogram hints 305 includes the sub-logogram and one or more subsequent sub-logograms of a logogram sequence of multiple logograms. The code may receive 520 a target logogram 310 selection that is selected from the logogram hints.

The code may determine 525 whether the target logogram 310 selection is a sub-logogram. If it is determined 525 that the target logogram selection is a sub-logogram of a desired logogram, the code returns to identifying 510 logogram hints 305 of the target logogram selection and repeats the identifying 510. However, if it is determined 525 that the target logogram 310 selection is not a sub-logogram of a desired logogram, the code enters 530 the target logogram 310. For example, the code may enter 530 the target logogram 310 into a document being written by a user, then the method 500 ends.

Figure 6:
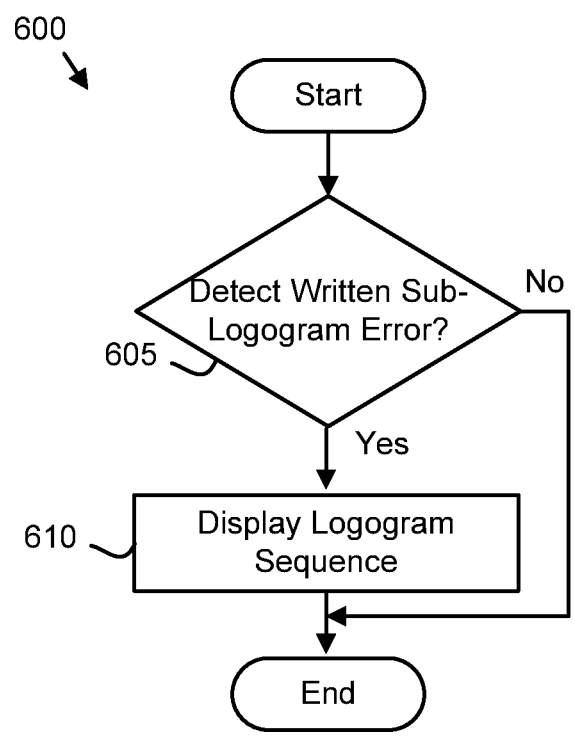
FIG. 6 is a schematic flow chart diagram illustrating one embodiment of a method that detects a sub-logogram error.

FIG. 6 is a schematic flow chart diagram illustrating one embodiment of a method 600 that detects a sub-logogram error. The method 600 may be performed by the processor 405. Alternatively, the method 600 may be performed by computer readable storage medium such as the memory 410. The computer readable storage medium may store code that is executable by the processor 405 to perform the functions of the method 600.

The method 600 starts, and in one embodiment, the code determines 605 whether it detects a sub-logogram error from a difference between a written input 110 and a given sub-logogram of a logogram sequence. If the code determines 605 that no sub-logogram error is detected, the method 600 ends. However, if the code determines 605 that there is a sub-logogram error, the code displays 610 the proper logogram sequence 330 in response to detecting the sub-logogram error, then the method 600 ends. In some embodiments, the code displaying 610 the proper logogram sequence 330 includes displaying the given sub-logogram. In other embodiments, the code displaying 610 the proper logogram sequence 330 includes displaying strokes of the given sub-logogram. Furthermore, in one embodiment, the code displaying 610 the proper logogram sequence 330 includes displaying the sub-logogram error. In certain embodiments, the code displaying 610 the proper logogram sequence 330 includes displaying 610 the proper logogram sequence 330 for writing each sub-logogram of multiple sub-logograms.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a written input device;
a processor;
a memory that stores code executable by the processor, the code comprising:
code that detects a sub-logogram from a written input to the written input device;
code that displays one or more logogram hints in response to detecting the sub-logogram, wherein each logogram hint comprises the sub-logogram and one or more subsequent sub-logograms of a logogram sequence of a plurality of sub-logograms;

code that detects a sub-logogram error from a difference between the written input and a given sub-logogram of the logogram sequence by comparing a first Unicode representation order corresponding to the logogram sequence with a second Unicode representation order corresponding to the written input; and code that displays the logogram sequence in response to detecting the sub-logogram error, wherein displaying the logogram sequence comprises displaying a plurality of strokes in sequential order based on the first Unicode representation order for writing the plurality of sub-logograms.

2. The apparatus of claim 1, the code further comprising code that receives a selection of a target logogram from the logogram hints.

3. The apparatus of claim 1, wherein displaying the logogram sequence comprises displaying the given sub-logogram.

4. The apparatus of claim 3, wherein displaying the given sub-logogram comprises displaying strokes of the given sub-logogram.

5. The apparatus of claim 1, wherein displaying the logogram sequence comprises displaying a proper sequence for writing each sub-logogram of a plurality of sub-logograms.

6. The apparatus of claim 1, wherein each sub-logogram is one or more of a Unicode representation and a plurality of strokes.

7. A method comprising:
   detecting, by use of a processor, a sub-logogram from a written input;
   displaying one or more logogram hints in response to detecting the sub-logogram, wherein each logogram hint comprises the sub-logogram and one or more subsequent sub-logograms of a logogram sequence of a plurality of sub-logograms;
   detecting a sub-logogram error from a difference between the written input and a given sub-logogram of the logogram sequence by comparing a first Unicode representation order corresponding to the logogram sequence with a second Unicode representation order corresponding to the written input; and
   displaying the logogram sequence in response to detecting the sub-logogram error, wherein displaying the logogram sequence comprises displaying a plurality of strokes in sequential order based on the first Unicode representation order for writing the plurality of sub-logograms.

8. The method of claim 7, the method further comprising receiving a selection of a target logogram from the logogram hints.

9. The method of claim 8, wherein displaying the logogram sequence comprises displaying the given sub-logogram.

10. The method of claim 9, wherein displaying the given sub-logogram comprises displaying strokes of the given sub-logogram.

11. The method of claim 9, wherein displaying the logogram sequence comprises displaying a proper sequence for writing each sub-logogram of a plurality of sub-logograms.

12. The method of claim 7, wherein each sub-logogram is one or more of a Unicode representation and a plurality of strokes.

13. A program product comprising a non-transitory computer readable storage medium that stores code executable by a processor, the executable code comprising code to perform:
   detecting a sub-logogram from a written input;
   displaying one or more logogram hints in response to detecting the sub-logogram, wherein each logogram hint comprises the sub-logogram and one or more subsequent sub-logograms of a logogram sequence of a plurality of sub-logograms;
   detecting a sub-logogram error from a difference between the written input and a given sub-logogram of the logogram sequence by comparing a first Unicode representation order corresponding to the logogram sequence with a second Unicode representation order corresponding to the written input; and
   displaying the logogram sequence in response to detecting the sub-logogram error, wherein displaying the logogram sequence comprises displaying a plurality of strokes in sequential order based on the first Unicode representation order for writing the plurality of sub-logograms.

14. The program product of claim 13, the executable code further receiving a selection of a target logogram from the logogram hints.

15. The program product of claim 13, wherein displaying the logogram sequence comprises displaying the given sub-logogram.

16. The program product of claim 15, wherein displaying the given sub-logogram comprises displaying strokes of the given sub-logogram.

17. The program product of claim 13, wherein displaying the logogram sequence comprises displaying a proper sequence for writing each sub-logogram of a plurality of sub-logograms.

* * * * *